(12) United States Patent
Petersson et al.

(10) Patent No.: US 6,937,910 B2
(45) Date of Patent: Aug. 30, 2005

(54) METHOD AND A SYSTEM FOR EVALUATING WHETHER A SIGNAL IS SUITABLE FOR FEED-FORWARD CONTROL

(75) Inventors: Mikael Petersson, Lund (SE); Tore Hägglund, Lund (SE); Karl-Erik Årzén, Malmö (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/416,788
(22) PCT Filed: Nov. 8, 2001
(86) PCT No.: PCT/SE01/02459
§ 371 (c)(1),
(2), (4) Date: Sep. 30, 2003
(87) PCT Pub. No.: WO02/41087
PCT Pub. Date: May 23, 2002

(65) Prior Publication Data
US 2004/0054427 A1 Mar. 18, 2004

(30) Foreign Application Priority Data
Nov. 15, 2000 (SE) ................................................ 0004171

(51) Int. Cl.[7] .............................................. G05B 13/02
(52) U.S. Cl. .......................... 700/44; 700/28; 700/37; 700/39; 700/45; 700/46; 361/561
(58) Field of Search .............................. 700/28, 37, 39, 700/44, 45, 46; 318/561

(56) References Cited

U.S. PATENT DOCUMENTS

| | | | |
|---|---|---|---|
| 4,006,346 A | | 2/1977 | Pemberton |
| 5,043,863 A | * | 8/1991 | Bristol et al. .................. 700/45 |
| 5,323,330 A | * | 6/1994 | Asplund et al. ............ 700/292 |
| 5,394,322 A | * | 2/1995 | Hansen ........................ 700/37 |
| 5,541,833 A | * | 7/1996 | Bristol et al. .................. 700/45 |
| 2003/0195641 A1 | * | 10/2003 | Wojsznis et al. .............. 700/42 |

OTHER PUBLICATIONS

K.J. Åström et al., PID Controllers: Theory, Design and Tuning, Instrument Society of America, Research Triangle Parc, NC, 2nd edition, 1995, Methods of Moments, pp. 27–28.

* cited by examiner

*Primary Examiner*—Ramesh Patel
(74) *Attorney, Agent, or Firm*—Venable LLP; Eric J. Franklin

(57) ABSTRACT

A method for evaluating whether a measurable disturbance on a process controlled by a feedback controller is suitable for feed-forward control. The disturbance is measured. The controller output signal due to the disturbance is measured. A first reference signal corresponding to the controller output signal is measured when responding to disturbance entering before the process. A second reference signal corresponding to the controller output signal is generated when responding to a disturbance entering after the process. It is estimated where in the process the disturbance enters by comparing the measured controller output signal due to the disturbance with the reference signals. It is evaluated whether the disturbance is suitable for feed-forward control depending on where in the process the disturbance enters.

26 Claims, 3 Drawing Sheets

METHOD AND A SYSTEM FOR EVALUATING WHETHER A SIGNAL IS SUITABLE FOR FEED-FORWARD CONTROL

FIELD OF THE INVENTION

This invention relates to a method for evaluating whether a measurable disturbance on a process controlled by a feedback controller is suitable for feed-forward control.

Further, the invention relates to a system for producing a parameter for evaluation of whether a measurable disturbance on a process, which is controlled by a feedback controller, is suitable for feed-forward control.

Further, the invention relates to a computer program product directly loadable into the internal memory of a digital computer, comprising software code portions for producing a parameter for evaluation of whether a measurable disturbance on a process, which is controlled by a feedback controller, is suitable for feed-forward control when said product is run on a computer.

Feedback control loops for controlling a process are common in the process industry, such as the pulp and paper industry and the petrochemical industry as well as in power plants. Furthermore, the invention particularly relates to evaluating whether a disturbance on a self-regulating process is suitable for feed-forward control.

The invention is particularly interesting for single input and single output control loops.

PRIOR ART

In the process industry, there are several hundreds of control loops in a typical plant. Most of them are controlled by PI-controllers. Many of those control loops do not perform satisfactorily for various reasons. The large amount of controllers and the limited resources in the maintenance and instrumentation departments of the plant imply the need for automatic tools identifying the loops which can offer potential improvements. The first step to be taken is to maintain and tune the control loops in the plant. If the performance of a control loop is still unsatisfying, a change of structure of the control loop must be considered. One reason why the performance is not improved, although such steps have been taken, is the fact that the process is influenced by disturbances. For example, the disturbances can be interactions from other control loops. A possible change of structure is then to extend the control structure with a feed-forward action. If the disturbance is measurable, it might be suitable for feed-forward control thereby improving the control performance. Since it might be costly to change the control structure in reality, an estimate of the improvement is desirable as a help in the decision. The problem to be solved is how to evaluate if a measurable disturbance is suitable or not for feed-forward control.

According to prior art, a method is known for evaluating the suitability for feed-forward control of a process based on cross-correlations of measured disturbances with the controlled variable. If a correlation is found between the disturbance and the controlled signal, the disturbance is suitable for feed-forward control. Such an evaluation method is very rough and it does not give a concrete measurement of the suitability for feed-forward control of the disturbance. For example, in a plant having many control loops it is desirable to evaluate which of the loops will gain most if its structure is changed to a feed-forward structure.

SUMMARY OF THE INVENTION

The object of the invention is to provide a method for evaluating whether a measurable disturbance on a process, controlled by a feedback controller, is suitable for feed-forward control. The method should also provide a measure of the degree of suitability. Thus, one object of the invention is to make it possible to compare the influence of several disturbances on one particular control loop. Another object of the invention is to make it possible to compare different control loops with each other and decide which one of the loops is the most suitable for feed-forward control.

The object of the invention is achieved through the method initially defined, characterized in that it comprises the steps of measuring said disturbance, measuring the controller output signal due to said disturbance, generating a first reference signal corresponding to the output signal from the controller when responding to a disturbance entering before the process, generating a second reference signal corresponding to the output signal from the controller when responding to a disturbance entering after the process, comparing the measured controller output signal due to the disturbance with the reference signals, and evaluating whether the disturbance is suitable for feed-forward control depending on said comparison.

The disturbance enter somewhere in the process and its suitability for feed-forward control is depending on where it enters in the process. The earlier the disturbance enters into the process the better it is suited for feed-forward control. If the disturbance enters too late in the process, it is not suited for feed-forward control. By comparing the behavior of the controller output due to the disturbance with two reference signals corresponding to the controller's behavior if the disturbance would enter before or after the process, it is possible to estimate where in the process the disturbance enters, and thus whether it can be used in the feed-forward control.

The method according to the invention is particularly useful for the process industry, where complex processes are controlled by PID-controllers and the process structure has not been used in the control configuration. By simple means, the inventive method makes it possible to detect control loops which would benefit from extending from a feedback loop to a combined feedback and feed-forward control structure. The method is applicable to all kinds of feedback loops, which have performance degradation due to interacting disturbances.

According to a preferred embodiment of the invention, said comparison comprises the steps of calculating a first value corresponding to the difference between the first and the second reference signal within a time interval, calculating a second value corresponding to the difference between the controller output signal due to the disturbance and one of the reference signals within said time interval, and comparing the calculated values. By calculating the difference between two signals within a time interval, the area between the signals in the interval is calculated. The area between the reference signals constitutes a reference area, to which the area between the controller output signal due to the disturbance and one of the reference signals is compared. By comparing the calculated areas, it is easily estimated if the disturbance enters early or late in the process and thus if the disturbance is useful for feed-forward control.

According to a preferred embodiment of the invention, said time interval corresponds to the open loop process response time. Such a time interval covers the transient phase of the process response in open loop. Preferably, said time interval is the average residence time for the process. It is advantageous to use the average residence time, since it is independent of the tuning of the controller.

According to a preferred embodiment of the invention, said comparison comprises the step of calculating a parameter corresponding to the relation between the first and second values, and that said evaluation depends on the calculated parameter. By calculating said parameter, which depends on the relation between the signal due to the disturbance and the reference area, a measure of the suitability for feed-forward control is obtained, which is comparable between different loops and processes. Thus, it is possible to compare parameters calculated for different loops and decide which loop will gain most on a feed-forward control.

According to a preferred embodiment of the invention, said parameter is the quotient between the values. Preferably, said parameter is the quotient between the second value and the first value. Such a parameter has values which are easy to classify and according to the classification it is easy to evaluate whether the loop is useful or not for feed-forward control.

According to one embodiment of the invention, the first and the second reference signal are generated by introducing a signal, corresponding to the measured values of the disturbance, before and after the process and measuring the controller output signal during the introduction. In this embodiment, the disturbance is experimentally introduced into the process and the output signal from the controller is measured. One advantage with this embodiment is that the disturbance is introduced into the real process so that the reference signals represent the actual behavior of the process and the controller. Another advantage is that it does not require any high calculating capacity.

According to another preferred embodiment of the invention, the first and the second reference signal are generated by introducing a signal corresponding to the measured values of the disturbance into a model of the process and of the controller and simulating the controller output signal during introduction of the disturbance before and after the process. One advantage with simulating is that it is fast, since it is not necessary to wait until the process responds to the disturbance. Another advantage is that it does not influence the process and can thus be used during normal operation.

According to a preferred embodiment of the invention, the disturbance is introduced before the process by addition of the measured values of the disturbance to the output signal from the controller before it is brought to the process. The disturbance is introduced after the process by addition of the measured values of the disturbance to the input signal to the controller, corresponding to the output signal from the process. Such an introduction makes it possible to integrate the generation of the reference signals with the controller.

According to a preferred embodiment of the invention, the first and the second reference signal are generated by using the measured values of the disturbance. Such reference signals are easily generated and such a method is suitable if there is only one or very few disturbances on the same process.

In another embodiment of the invention, the first and the second reference signal correspond to a step signal. The reference signals are generated by introducing a step signal before and after the process and thereafter the generated reference signals are transformed for adaptation to the present disturbance situation. This way of generating the reference signals is advantageous should there be several disturbances on the process. The step signal only needs to be introduced twice in the process (before and after) and then the reference signals are transformed due to the different disturbances. Thus unnecessary experiments on the process system are avoided.

Another object of the invention is to provide a system for evaluating whether a measurable disturbance on a process, controlled by a feedback controller, is suitable for feed-forward control. This object is achieved through a system initially defined, characterized in that it comprises means for measuring the disturbance, means for measuring the controller output signal due to said disturbance, means for storing the measured values, means for generating a first reference and a second reference signal corresponding to the output signal from the controller when responding to a disturbance entering before and after the process, respectively, and means for calculating said parameter depending on the measured controller output signal due to the disturbance and the reference signals.

According to an embodiment of the invention, said means for generating the first and the second reference signal comprises means for introducing a signal corresponding to the measured values of the disturbance before and after the process, which means is a part of the controller. If the reference signals are to be generated experimentally in the process the control system has to be rebuilt, which is rather complicated. By integrating the introduction means as a part of the controller from the beginning, the need for rebuilding the control system is avoided.

The invention also refers to a computer program product according to the corresponding appended claims. It is easily realized that the method according to the invention defined in the appended set of method claims is well suited for being achieved by a computer program having instructions corresponding to the steps of the inventive method and executing said instructions when run on a processor unit. Although not explicitly expressed in the claims, the invention also covers a computer program product and a system in combination with the method according to any of the appended method claims.

BRIEF DESCRIPTION OF THE DRAWINGS

With reference to the enclosed drawings, a more close description of examples of preferred embodiments of the invention follows.

DETAILED DESCRIPTION OF PREFERRED EMBODIMENTS OF THE INVENTION

Figure 1:
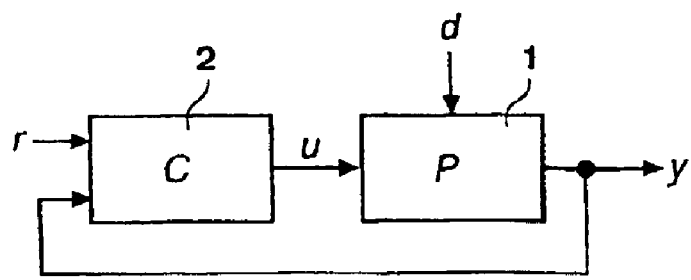
FIG. 1 shows a single input-single output control loop with a disturbance entering the process

FIG. 1 shows a single input-single output feedback control loop controlling a process 1 with a controller 2 and having a disturbance entrance d entering the process. Such control loops are common in the industry. The set-point signal to the controller 2 is denoted r, the controller output signal is denoted u, and the output signal from the process is denoted y. The disturbance could be any kind of measurable disturbance which enters somewhere in the controlled process.

The aim with the invention is to decide if the disturbance could be used to improve the performance of the loop by feed-forward control and to estimate the benefit of a feed-forward control. This is done by estimating where the disturbance enters in the process and, depending on where it enters, evaluate whether it can be used for feed-forward control or not. The interesting case is when the disturbance enters early in the process. If the disturbance enters late, both the feedback and the feed-forward controller will take action. This might result in a degraded performance, if not suitable measures are taken.

Figure 2:
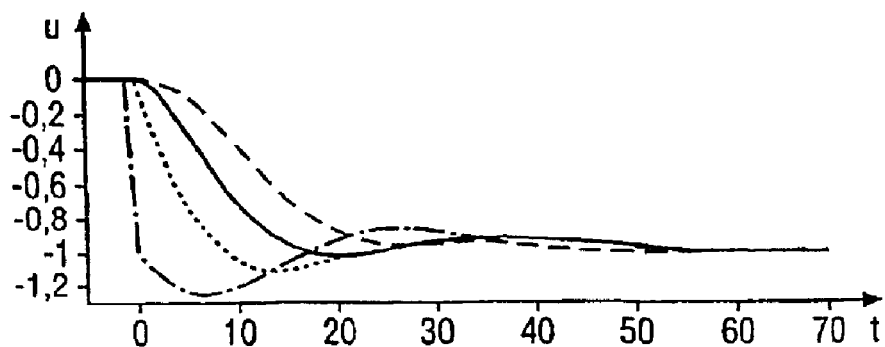
FIG. 2 is a diagram showing the behavior of the controller output signal during a step disturbance for four different entry points in the process.

The idea of the invention is to compare the influence of the disturbance on the control loop with two reference signals. The reference signals may preferably be chosen as the output signals from the controller. FIG. 2 shows the output signal from the controller versus time when a step disturbance enters in the process in four different cases. The four cases are when the step disturbance enters before (dashed), early in (solid), late in (dotted) and after (dash-dotted) the process. In this embodiment the reference signals are chosen as the extreme cases when the disturbance enters before and after the process. By comparing the actual control signal due to a disturbance with the reference signals it is possible to estimate whether the disturbance can be used for feed-forward control or not.

Figure 3:
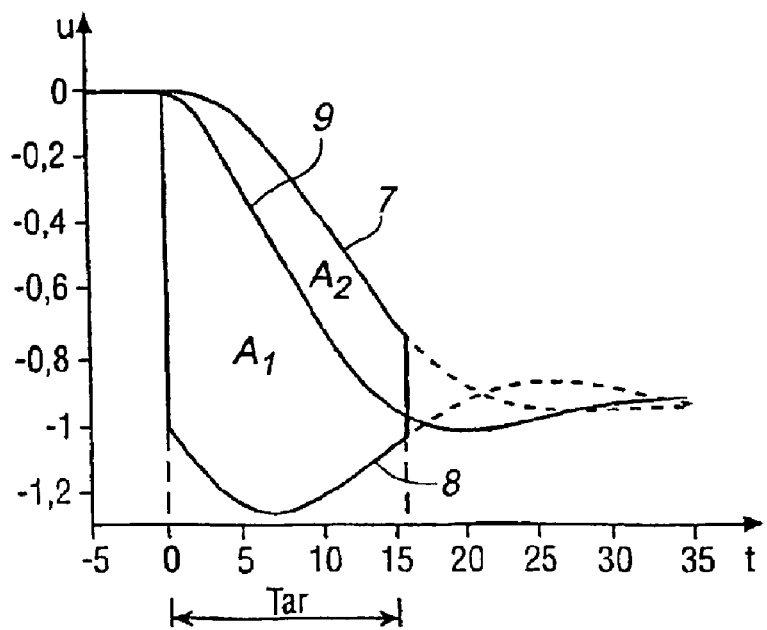
FIG. 3 is a diagram showing the controller signal due to the disturbance, two reference signals, and the areas $A_1$ and $A_2$ between the signals.

FIG. 3 is a diagram showing the controller output signal versus time. The diagram shows the reference signal 7 corresponding to a case when the disturbance enters before the process, the reference signal 8 corresponding to a case when the disturbance enters after the process, and the actual control signal 9 due to the disturbance. There are many ways to compare the actual control signal due to the disturbance with the reference signals. Other characteristic values for the signals can be used for the comparison of, for example the time between the observed disturbance till the maximum, or minimum, peak value of the signals.

In this embodiment, the areas between the signals are compared. The area between the signal 9 due to the disturbance and the after-reference signal 8 is labeled $A_1$ in the diagram and the area between the before-reference signal 7 and the actual control signal 9 due to the disturbance is labeled $A_2$. The area between the two reference signals constitutes a reference area and is the sum of the two areas $A_{ref}=A_1+A_2$. The area $A_1$ is compared with the reference area $A_{ref}$. The comparison is accomplished by calculating a parameter M and in this embodiment the parameter is the ratio between the area $A_1$ and the reference area $A_{ref}$.

$$M=A_1/A_{ref}$$

The areas are compared during an initial phase of the disturbance. The time interval, over which the parameter is calculated, should cover the transient phase of the process response of the control loop. Preferably, the average residence time $T_{ar}$ is chosen as the time-window for calculation. The length of the average residence time depends on the process and varies between different processes. In the diagram shown in FIG. 3, the average residence time $T_{ar}$ is 15s. The average residence time for a system is defined as:

$$T_{ar} = \frac{\int_0^\infty (s(\infty) - s(t)) dt}{K},$$

where s(t) is the step response of the system and K is the static gain. There are several ways to obtain the average residence where s(t) is the step response of the system and K is the static gain. There are several ways to obtain the average residence time. For example, methods of moments can be used, or it can be estimated from measurements. Methods for estimating the average residence time is described in a book by K. J. Åström and T. Hägglund, "PID Controllers: Theory, Design and Tuning", Instrument Society of America, Reseach Triangle Parc, N.C., second edition, 1995, pages 27–28. An advantage with using the average residence time is that it is independent of the controller tuning.

In another embodiment of the invention the time interval could be the open loop settling time for the process. The settling time is the time it takes before a step response remains within x % of its steady value. Preferably, the value x is between 1% and 3%, commonly x=2%. Due to noise, the time interval should be chosen as short as possible but still the time must be long enough to contain the dynamics of the process. The settling time fulfills both requirements.

The parameter M is defined as:

$$M = \int_0^{T_{ar}} \frac{u(t) - u_{after}(t)}{u_{before}(t) - u_{after}(t)} dt,$$

where $u_{before}(t)$ and $u_{after}(t)$ are the controller's response to a corresponding disturbance entering before and after the process, respectively.

The parameter M ranks the suitability of the disturbance for feed-forward control. A larger value indicates that the disturbance is suitable as a feed-forward control signal. The threshold value of the parameter, above which feed-forward control is recommended, depends on the implementation structure of the feed forward part. A general threshold for suggesting the use of feed forward may be in the interval 0.6–0.8, and preferably 0.7.

Figure 4A:
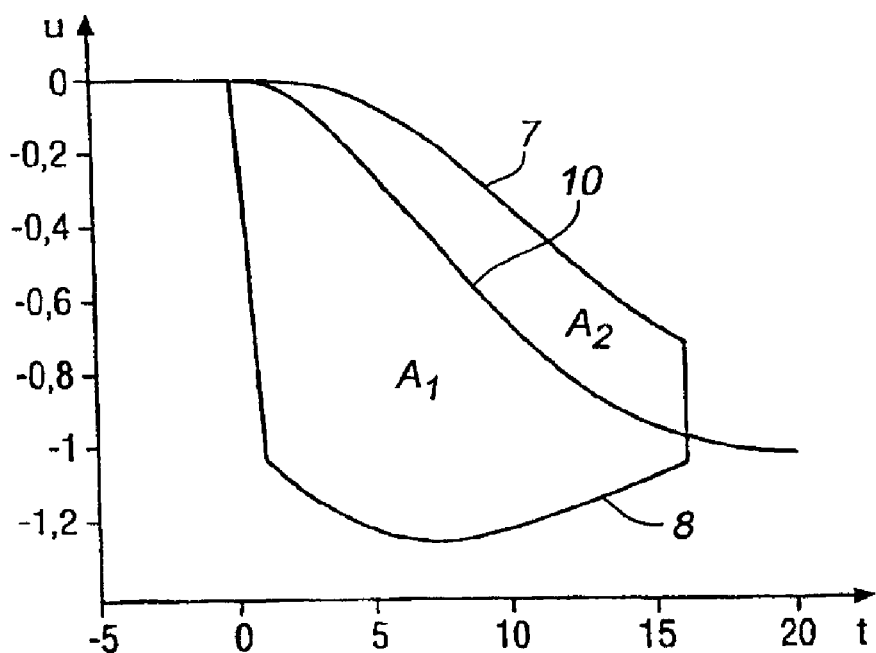
FIG. 4a is a diagram showing the controller signal due to the disturbance and the reference signals when the disturbance enters early in the process.
Figure 4B:
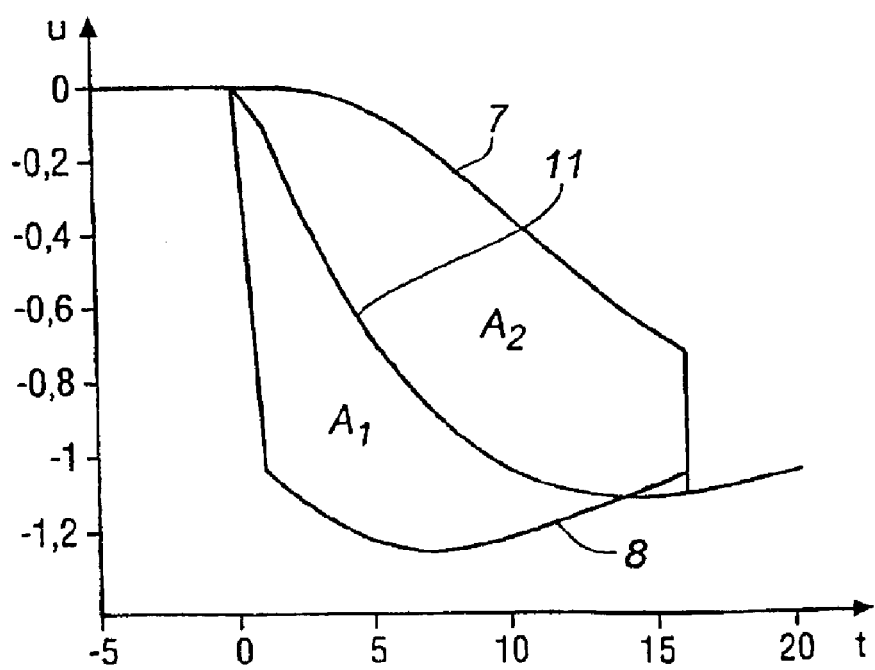
FIG. 4b is a diagram showing the controller signal due to the disturbance and the reference signals when the disturbance enters late in the process.

FIG. 4a shows an example of the controller output signal 10 when the disturbance enters early into the process. The area $A_1$ is large compared with the reference area $A_1+A_2$, and thus the quotient of the areas $A_1/(A_1+A_2)$ will have a value close to one. In the example shown in FIG. 4a the value of the parameter is M=0.74, and the disturbance is thus suitable as a feed-forward control signal. FIG. 4b shows an example of the controller output signal 11 when the disturbance enters late into the process. The area $A_1$ is small compared with the reference area $A_1+A_2$, and thus the quotient of the areas will have a value close to zero. In this example, the value of the parameter is M=0.39, and the conclusion is that the disturbance is not suitable as a feed-for-ward control signal.

The reference signals could be obtained in many different ways. One way is to measure the actual disturbance and use the measured values for the generation of the reference signals. The reference signals can, for example, be generated by introducing the measured values of the disturbance before and after the process in an experimental way, or by using simulation. If the signals are generated in an experimentally way the reference signal generation could either be implemented into the control system of the process or into the controller.

Figure 5:
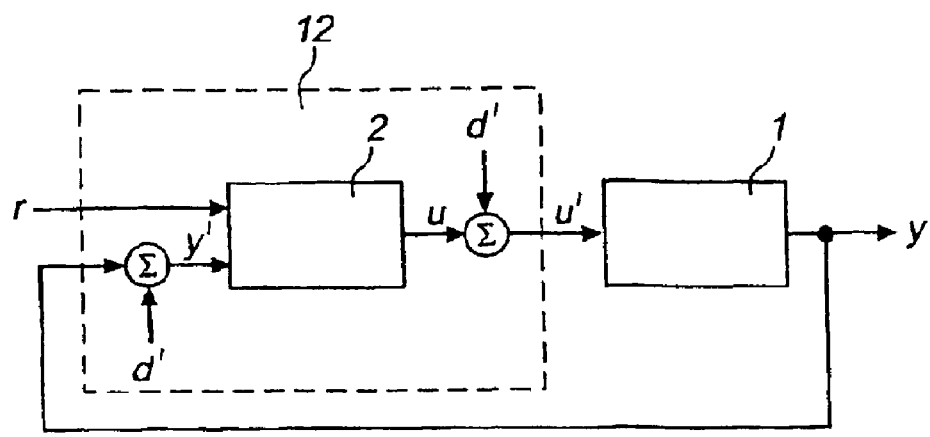
FIG. 5 is a block diagram showing a controller comprising the generation of the reference signals.

FIG. 5 shows an embodiment having the reference signal generation implemented into the controller 12. The controller is introducing the disturbance by adding it to its internal signals. The before-reference signal is generated by adding the measured values d' of the disturbance to the output signal u from the controller 12, thus creating the new input signal u'=u+d' to the process, and measuring the controller output signal u during the addition of the disturbance values. The after-reference signal is generated by adding the measured values d' of the disturbance to the input signal to the controller y', corresponding to the output signal y from the process (y'=y+d'), and measuring the controller output signal u during the addition of the disturbance values. To avoid other effects on the signals, the set-point signal r to the controller 12 is held constant during the measurement of the disturbance and the generation of the reference signals. In this example, the reference signals are obtained by manual experiments in that the controller introduces the measured disturbance in the process after approval from an operator.

The reference signals can also be generated through simulation. The simulated system has a controller corresponding to the one in the control system, preferable a model of the controller, and a model of the process. The measured disturbance is introduced before and after the process model, and the controller output is registered for the two cases.

The disturbance signal used for generation of the reference signals does not necessarily have to be measured values of the disturbance. It is, for example, possible to use a step signal as the disturbance signal in the previously described methods for generating the reference signals. The reference signals are generated once by introducing the step signal before and after the process. The generated reference signals are then afterwards transformed to be adapted to the present disturbance situation. For example, they are transformed by a transformation filter. If there are more than one disturbance on the process, reference signals are generated by first generating an intermediate pair of reference signals due to the step disturbance, and then transforming the intermediate pair of reference signals for each disturbance by adapting them to that particular disturbance.

When the controller output signal due to the disturbance is measured and stored, and the reference signals are calculated and stored, the feed-forward parameter M could be calculated. As the time interval in the calculation, an estimation of the average residence time for the system is used. The reference area $A_{ref}$ is estimated by calculating the sum of the difference between stored values of the before and after reference signal in the time interval. The area $A_1$ is estimated by calculating the sum of the difference between stored values of the controller output signal due to the disturbance and the after reference signals during the time interval. For calculation of the parameter M the quotient between the area $A_1$ and the reference area $A_{ref}$ is calculated.

Figure 6:
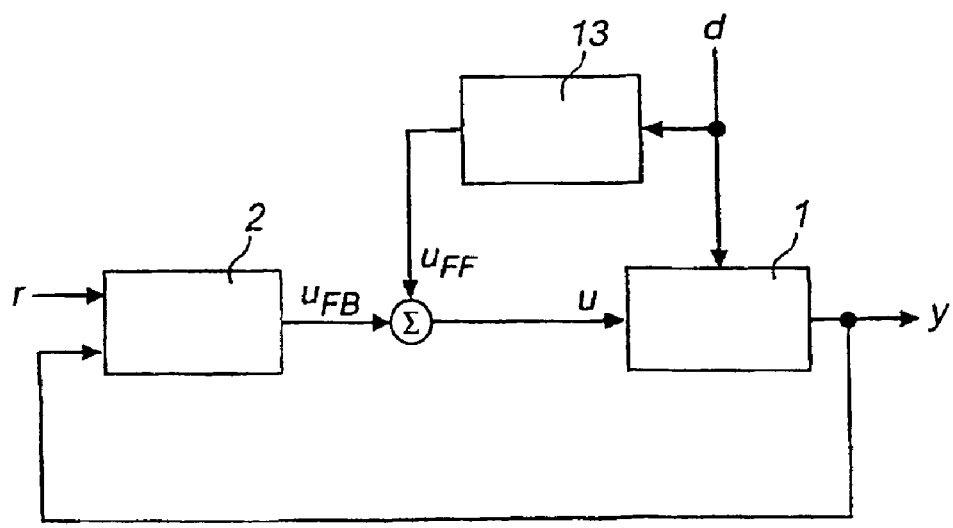
FIG. 6 shows the single input-single output control loop with feed forward extension.

The parameter M can be used for either manual evaluation of control loops or in a supervision module. This module can be a part of the controller, control system, or reside on a remote tool connected via a network. The parameter M indicates if feed-forward control action should be added. FIG. 6 shows a feed-forward controlled process. The disturbance d is fed to a feed-forward controller 13 and the output signal $U_{FF}$ from the feed-forward controller is added to the output signal $U_{FB}$ from the feedback controller 2.

Multiple-input multiple-output processes can also be found in the industry. These are often controlled by more complex controllers, such as model predictive control products. The invention can be applied to these processes as well.

The implementation of the invention is preferably made in software such as a computer program comprising instructions to be executed by a processor. This software can either be a part of the control system, a part of the controller, or a separate program module or a combination thereof.

What is claimed is:

1. A method for evaluating whether a measurable disturbance on a process controlled by a feedback controller is suitable for feed-forward control, the method comprising:

measuring said disturbance, measuring the controller output signal due to said disturbance, generating a first reference signal corresponding to the controller output signal when responding to a disturbance entering before the process, generating a second reference signal corresponding to the controller output signal when responding to a disturbance entering after the process, estimating where in the process the disturbance enters by comparing the measured controller output signal due to the disturbance with the reference signals, and evaluating whether the disturbance is suitable for feed-forward control depending on where in the process the disturbance enters.

2. The method according to claim 1, wherein said comparison comprises calculating a first value corresponding to the difference between the first and the second reference signal within a time interval, calculating a second value corresponding to the difference between the controller output signal due to the disturbance and one of the reference signals within said time interval and comparing the calculated values.

3. The method according to claim 2, wherein said time interval corresponds to the open loop process response time.

4. The method according to claim 2, wherein said first value is calculated by subtracting the second reference signal from the first reference signal, and that said second value is calculated by subtracting the second reference signal from the measured controller output signal due to the disturbance.

5. The method according to claim 2, wherein said comparison comprises calculating a parameter corresponding to the relation between the first and second values, and wherein said evaluation depends on the calculated parameter.

6. The method according to claim 5, wherein said parameter is the quotient between the values.

7. The method according to claim 6, wherein said parameter is the quotient between the second value and the first value.

8. The method according to claim 7, wherein the process is suitable for feed-forward control if said parameter is lager than 0.6.

9. The method according to claim 1, wherein the first and the second reference signal are generated by using the measured values of the disturbance.

10. The method according to claim 9, wherein the first and the second reference signal are generated by introducing a signal corresponding to the measured values of the disturbance before and after the process and measuring the controller output signal during the introduction.

11. The method according to claim 9, wherein the first and the second reference signal are generated by introducing a signal corresponding to the measured values of the disturbance into a model of the process and of the controller and simulating the controller output signal during introduction of the disturbance before and after the process.

12. The method according to claim 10, wherein the disturbance is introduced before the process by addition of the measured values of the disturbance to the output signal from the controller before it is brought to the process.

13. The method according to claim 9, wherein the disturbance is introduced after the process by addition of the measured values of the disturbance to input signal to the controller, corresponding to the output signal from the process.

14. The method according to claim 1, wherein the first and the second reference signal correspond to a step signal.

15. A system for producing a parameter for evaluation of whether a measurable disturbance on a process, which is controlled by a feedback controller is suitable for feedforward control, the method comprising:
- means for measuring the disturbance,
- means for measuring the controller output signal due to said disturbance,
- means for storing the measured values,
- means for generating a first reference signal and a second reference signal corresponding to the controller output signal when responding to a disturbance entering before and after the process, respectively, and
- means for calculating said parameter depending on an estimation of where in the process the disturbance enters, wherein the estimation depends on a comparison between said measured controller output signal and the reference signals.

16. The system according to claim 15, wherein said means for calculating the parameter comprises means for calculating a first value corresponding to the difference between the first and the second reference signal within a time interval, and for calculating a second value corresponding to the difference between the controller output signal due to the disturbance and one of the reference signals within said time interval and for calculating a relation between the first and second values.

17. The system according to claim 15, wherein said means for generating the first and the second reference signal comprises means for introducing a signal corresponding to the measured values of the disturbance before and after the process.

18. The system according to claim 15, wherein said means for generating the first and the second reference signal is part of the controller.

19. The system according to claim 15, wherein said means for generating the first and the second reference signal comprise a model of the process and of the controller and means for simulating the controller output signal during said introduction of the disturbance.

20. A computer program product directly loadable into the internal memory of a digital computer, comprising software code portions for producing a parameter for evaluation of whether a measurable disturbance on a process, which is controlled by a feedback controller, is suitable for feedforward control when said product is run on a computer, wherein the portions comprise:
- receiving measured values of said disturbance and the controller output signal,
- storing the measured values of said disturbance and values of the controller output signal due to said disturbance,
- generating a first reference signal corresponding to the controller output signal when responding to a disturbance entering before the process,
- generating a second reference signal corresponding to the controller output signal when responding to a disturbance entering after the process, and
- calculating said parameter depending on an estimation of where in the process the disturbance enters, wherein the estimation depends on a comparison between said measured controller output signal and the reference signals.

21. The computer program product according to claim 20, wherein said calculating of the parameter comprises calculating a first value corresponding to the difference between the first and the second reference signal within a time interval, calculating a second value corresponding to the difference between the controller output signal due to the disturbance and one of the reference signal within said time interval and calculating the quotient between the values.

22. The computer program product according to claim 20, wherein the first and the second reference signal are generated by using the measured values of the disturbance.

23. The computer program product according to claim 20, wherein the disturbance is introduced before the process by adding the measured values of the disturbance to the output signal from the controller, before it is brought to the process, and the disturbance is introduced after the process by adding the measured values of the disturbance to the output signal from the process, before it is brought to the controller.

24. The computer program product according to claim 20, wherein it comprises software code portions for running the controller.

25. The computer program product according to claim 20, wherein it is stored at a computer readable medium.

26. The computer program product according o claim 20, wherein it is provided at least partially through a network such as the Internet.

* * * * *